United States Patent
Shkedy et al.

(10) Patent No.: US 12,294,603 B2
(45) Date of Patent: May 6, 2025

(54) APPLICATION SECURITY TESTING BASED ON LIVE TRAFFIC

(71) Applicant: Traceable Inc., San Francisco, CA (US)

(72) Inventors: Inon Shkedy, Berkeley, CA (US); Roshan Piyush, Bengaluru (IN); Sanjay Nagaraj, Dublin, CA (US); Satish Kumar Mittal, Bengaluru (IN); Juan Pablo Tosso Alvarez, Santiago (CL)

(73) Assignee: TRACEABLE INC, San Francisco, CA (US)

( * ) Notice: Subject to any disclaimer, the term of this patent is extended or adjusted under 35 U.S.C. 154(b) by 255 days.

(21) Appl. No.: 17/571,463

(22) Filed: Jan. 8, 2022

(65) Prior Publication Data

US 2023/0224318 A1    Jul. 13, 2023

(51) Int. Cl.
   *H04L 29/06*      (2006.01)
   *G06F 9/54*       (2006.01)
   *H04L 9/40*       (2022.01)

(52) U.S. Cl.
   CPC .......... *H04L 63/1433* (2013.01); *G06F 9/547* (2013.01)

(58) Field of Classification Search
   CPC ............. H04L 63/1433; H04L 63/1466; G06F 21/577; G06F 21/566; G06F 9/547; G06F 21/54
   See application file for complete search history.

(56) References Cited

U.S. PATENT DOCUMENTS

| | | | |
|---|---|---|---|
| 9,794,339 B2 * | 10/2017 | Clothier | H04L 67/1097 |
| 10,558,809 B1 * | 2/2020 | Joyce | G06N 5/046 |
| 2011/0154489 A1 * | 6/2011 | Jeong | H04L 63/1416 726/22 |
| 2018/0330102 A1 * | 11/2018 | Siman | G06F 16/2433 |
| 2020/0169577 A1 * | 5/2020 | Oh | G06N 20/00 |

* cited by examiner

*Primary Examiner* — Yogesh Paliwal
(74) *Attorney, Agent, or Firm* — LexAnalytico Consulting; Riyon Rae Harding (57) ABSTRACT

Live and legitimate user traffic is used with in depth knowledge of the business logic for an API specification to perform security testing on a set of APIs. The present system intercepts and analyzes application program interface (API) traffic, identifies user session data, and identifies traffic suitable to duplicate. The identified traffic is duplicated and modified by addition of malicious code. The modified code is then sent to its intended API destination, where it is processed as normal. The resulting response and other traffic as well as the API system and optionally other systems, such as datastore systems, are analyzed to determine if the malicious code resulted in a valid attack. Results from the modified code attack attempts are reported to a user.

20 Claims, 8 Drawing Sheets

APPLICATION SECURITY TESTING BASED ON LIVE TRAFFIC

BACKGROUND

Web-based applications have been subject to entity attacks that seek to improperly access data. Early attacks were based on viruses that could be identified as a specification file. Many modern attacks, however, are targeted towards application program interfaces (APIs), and cannot be detected by specification violations. Most security solutions on the market do not understand details of the operation for a particular API, but rather look for known patterns of exploitations. It is difficult to test an application to determine where vulnerabilities exist in the application. What is needed is an improvement in testing for application security.

SUMMARY

The present system, roughly described, uses live and legitimate user traffic with in depth knowledge of the business logic for an API specification to perform security testing on a set of APIs. The present system intercepts and analyzes application program interface (API) traffic, identifies user session data, and identifies traffic suitable to duplicate. The identified traffic is duplicated and modified by addition of malicious code. The modified code is then sent to its intended API destination, where it is processed as normal. The resulting response and other traffic as well as the API system and optionally other systems, such as datastore systems, are analyzed to determine if the malicious code resulted in a valid attack. Results from the modified code attack attempts are reported to a user.

In some instances, a method performs application security testing. The method begins with accessing intercepted application program interface(API) traffic transmitted between a client device and a server. A subset of the intercepted traffic is identified to duplicate, wherein the subset selected based on parsing the intercepted traffic. The subset of intercepted traffic is then duplicated. The system then modifies the duplicated subset of intercepted traffic, wherein the modification including transforming the duplicated traffic to include malicious code. The modified duplicate traffic is then transmitted to the server. The system then detects whether the modified duplicate traffic resulted in a successful attack event on the server.

In some instances, a non-transitory computer readable storage medium has embodied thereon a program that is executable by a processor to perform a method. The method performs session-based anomaly detection. The method begins with accessing intercepted application program interface (API) traffic transmitted between a client device and a server. A subset of the intercepted traffic is identified to duplicate, wherein the subset selected based on parsing the intercepted traffic. The subset of intercepted traffic is then duplicated. The system then modifies the duplicated subset of intercepted traffic, wherein the modification including transforming the duplicated traffic to include malicious code. The modified duplicate traffic is then transmitted to the server. The system then detects whether the modified duplicate traffic resulted in a successful attack event on the server.

In embodiments, a system can include a server, memory and one or more processors. One or more modules may be stored in memory and executed by the processors to access intercepted application program interface (API) traffic transmitted between a client device and a server, identify a subset of the intercepted traffic to duplicate, the subset selected based on parsing the intercepted traffic, duplicate the subset of intercepted traffic, modify the duplication of the subset of intercepted traffic, the modification including transforming the duplicated traffic to include malicious code, transmit the modified duplicate traffic to the server, and detect whether the modified duplicate traffic resulted in a successful attack event on the server.

DETAILED DESCRIPTION

The present system uses live and legitimate user traffic with in depth knowledge of the business logic for an API specification to perform security testing on a set of APIs. The present system intercepts and analyzes application program interface (API) traffic, identifies user session data, and identifies traffic suitable to duplicate. The identified traffic is duplicated and modified by addition of malicious code. The modified code is then sent to it's intended API destination, where it is processed as normal. The resulting response and other traffic as well as the API system and optionally other systems, such as datastore systems, are analyzed to determine if the malicious code resulted in a valid attack. Results from the modified code attack attempts are reported to a user.

Traffic can be suitable to duplicate if it meets one or more requirements. For example, traffic targeted for duplication may be traffic associated with a particular user session, user role, from a particular intercepting agent or environment, intercepted during a certain time of day, and so forth. By intercepting API traffic and analyzing the traffic, the present system can determine user session data, API business logic, correlations between API traffic components, and other characteristics of the API traffic that are not available to other systems. The present system may use the API traffic characteristics in combination with the intercepted legitimate user traffic to create malicious API requests to test the security of an application.

Figure 1:
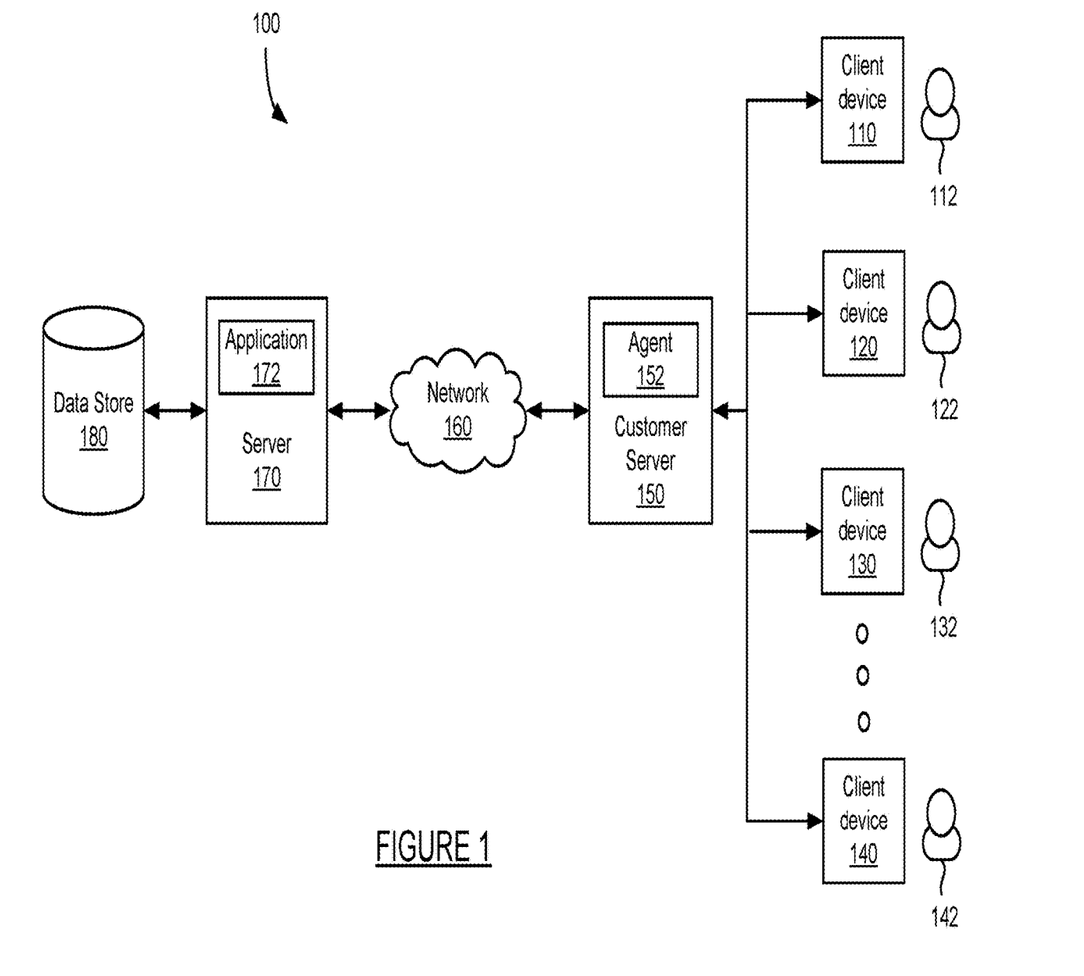
FIG. 1 is a block diagram of a system for performing application security testing using an agent installed in a customer environment.

FIG. 1 is a block diagram of a system for performing application security testing using an agent installed in a customer environment. The block diagram 100 of FIG. 1 includes client devices 110-140, customer server 150, network 160, Application server 170, and data store 180.

Client devices 110-140 may send API requests to and receive API responses from customer server 150. The client devices may be any device which can access the service, network page, webpage, or other content provided by customer server 150. Client devices 110-140 may send a request to customer server 150, for example to an API provided by customer server 150, and customer server 150 may send a response to the devices based on the request. The request may be sent to a particular URL provided by customer server 150 and the response may be sent from the server to the device in response to the request. Though only for four client devices are shown, a typical system may handle requests from a larger number of clients, for example, dozens, hundreds, or thousands, and any number of client devices may be used to interact with customer server 150.

Customer server 150 may provide a service to client devices 110-140. The service may be accessible through APIs provided by customer server 150. Agent 152 on customer server 150 may monitor the communication between customer server 150 and client devices 110-140 and intercept traffic transmitted between the server and the devices. Upon intercepting the traffic, agent 152 may forward the traffic to application 172 on application server 170. In some instances, one or more agents may be installed on customer server 150, which may be implemented by one or more physical or logical machines. In some instances, server 150 may actually be implemented by multiple servers in different locations, providing a distributed service for devices 110-140. In any case, one or more agents 152 may be installed to intercept API requests and responses between devices 110-140 and customer server 150, in some instances may aggregate the traffic by API request and response data, and may transmit request and response data to application 172 on server 170.

Network 140 may include one or more private networks, public networks, intranets, the Internet, an intranet, wide-area networks, local area networks, cellular networks, radio-frequency networks, Wi-Fi networks, any other network which may be used to transmit data, and any combination of these networks. Client devices 110-140, customer server 150, Application server 170, and data store 180 may all communicate over network 160 (whether or not labeled so in FIG. 1).

Application server 170 may be implemented as one or more physical or logical machines that provide functionality as described herein. In some instances, application server 170 may include one or more applications 172. The application 172 may be stored on one or more application servers 170 and be executed to perform functionality as described herein. Application server and application 172 may both communicate over network 160 with data store 180. Application 172 is discussed in more detail with respect to FIG. 3.

Data store 180 may be accessible by application server 170 and application 172. In some instance, data store 180 may include one or more APIs, API descriptions, metric data, and other data referenced and/or described herein. In some instance, data store 180 may be implemented as one or more data stores at one or more locations.

Figure 2:
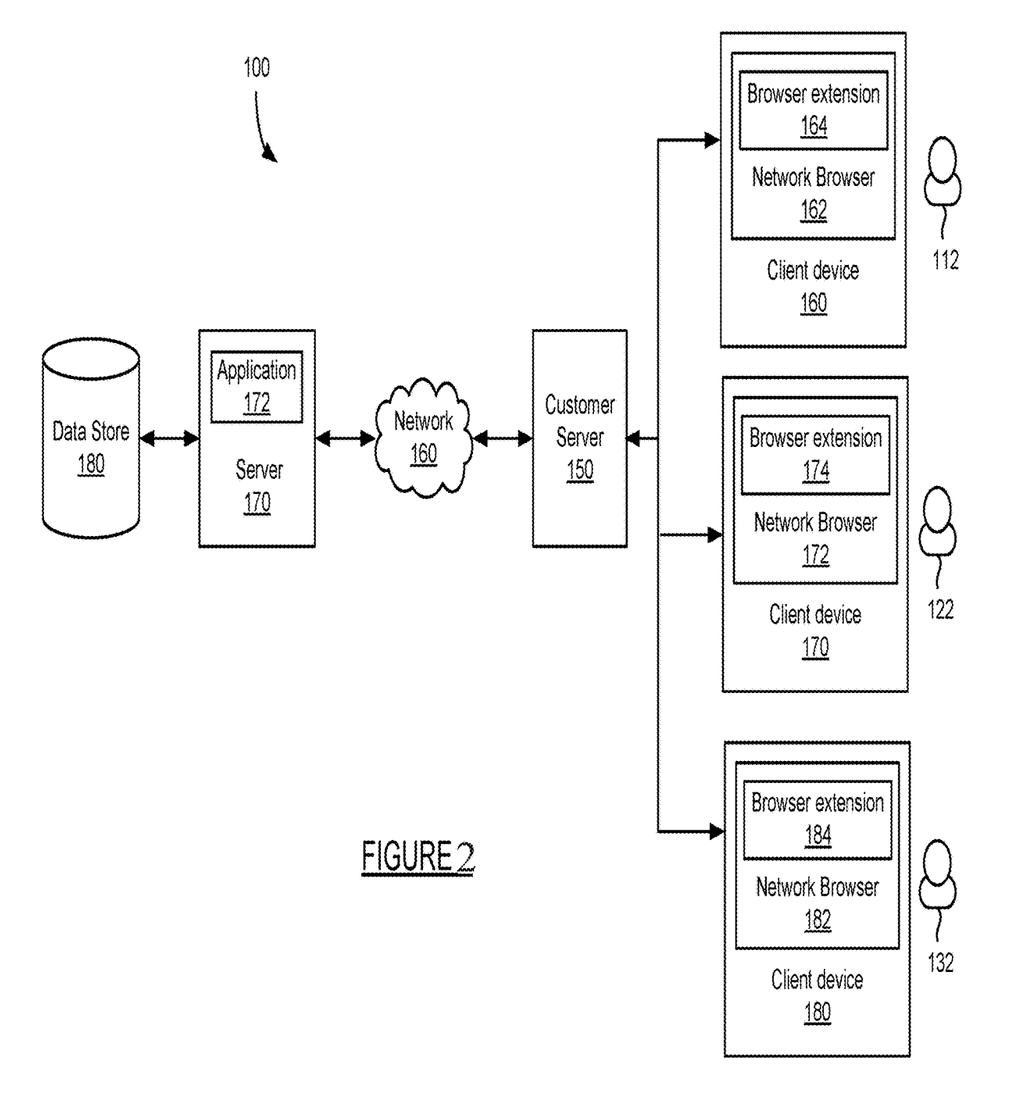
FIG. 2 is a block diagram of a system for performing application security testing using code installed in a network browser.

FIG. 2 is a block diagram of a system for performing application security testing using code installed in a network browser. The network 160, server 170, and data store 180 of FIG. 2 are similar to those described with respect to FIG. 1. Client devices 160-180 each include a network browser, which includes a browser extension. For example, client device 160 includes network browser 162 and browser extension 164 installed in the network browser. In the system of FIG. 2, instead of intercepting API traffic between server 170 and client devices at customer server 150, traffic information is captured at each client device by a browser extension. Implementing a browser extension may affect the traffic captured, in some instances, for example by capturing client device response traffic rather than both request and response traffic.

Figure 3:
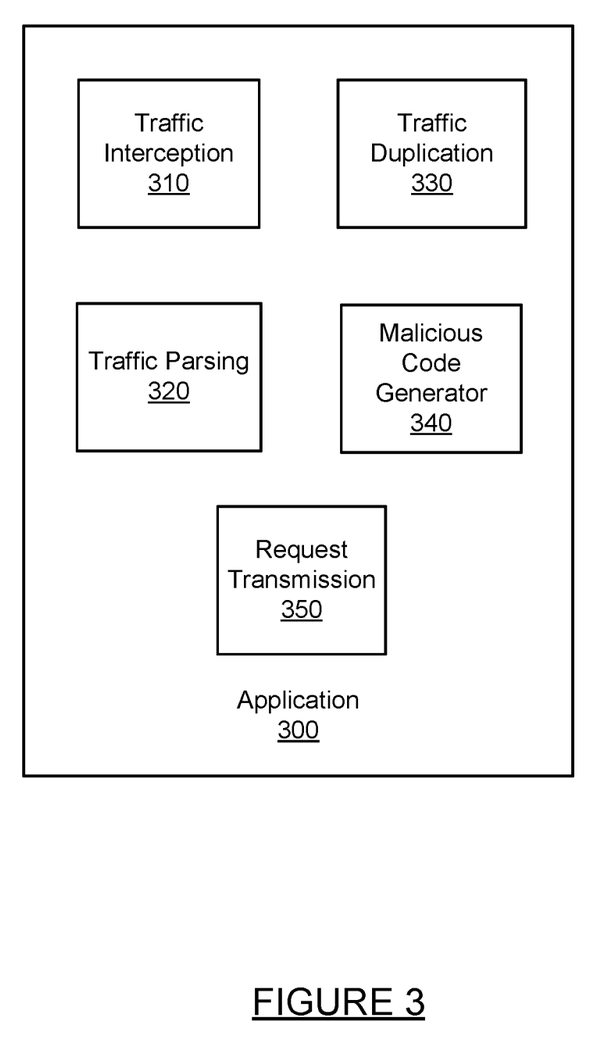
FIG. 3 is a block diagram of an application for performing application security testing.

FIG. 3 is a block diagram of an application for performing application security testing. The application 300 provides more detail for application 172 in FIGS. 1 and 2. Application 300 includes traffic interception 310, traffic parsing 320, traffic duplication 330, malicious code generator 340, and request transmission 350. Traffic interception module 310 may receive and/or intercept traffic sent between clients and one or more servers. Traffic interception module 310 may be implemented on application 300, on one or more agents on a customer server, within a browser extension, or as some other implementation. In some instances, traffic interception 310 receives intercepted traffic data, such as intercepted traffic that has been aggregated one or more agents or browser extensions and is then transmitted to a server.

Traffic parsing 320 may receive the intercepted traffic and parses traffic. In some instances, traffic parsing module 320 may parse the traffic to identify user identifiers, session identifiers, user roles, API parameters and/or variables, API addresses, API request and response headers, and other data within intercepted traffic.

Traffic duplication 330 may duplicate one or more subsets of intercepted traffic. The subset may include traffic associated with a particular user ID, a user role, traffic intercepted by a particular agent, traffic having a marker, flag, or some other indicator that it should be duplicated, or other traffic.

Malicious code generator 340 may modify duplicated traffic to include malicious code within the traffic. For example, malicious code generator may modify one or more parameters of an API request. Malicious code generator may generate malicious segments of code, such as a changed parameter, based at least in part on information retrieved from traffic parsing module 320 as a result of parsing intercepted traffic. The malicious code can be created based on the system's knowledge of the API, application business logic, API correlation data, user sessions, and/or other data about the traffic and system(s) that transmits the traffic. More details for determining a user session are disclosed in U.S. patent application Ser. No. 17/567,785, titled "Session Based Anomaly Detection," filed on Jan. 3, 2022, the disclosure of which is incorporated herein by reference. More details for determining information regarding an API are disclosed in U.S. patent application Ser. No. 17/339,951, titled "Automatic Anomaly Detection Based on API Sessions," filed on Jun. 5, 2021, the disclosure of which is incorporated herein by reference.

Request transmission 350 may send modified duplicated traffic, for example API requests with malicious code inserted therein, to a server. Request transmission 350 may send one API at a time, and in some instances may change only one parameter in an API request. By changing only one parameter, the system may isolate the effect, if any, that a changed parameter value has on a successful attack event. Application 300 may store results of the API request transmission to a local data store or remotely.

In some instances, the present system may report attack metric data through a dashboard. A dashboard manager with the application may generate and provide a dashboard for a user, for example as a webpage over network. The dashboard manager may coordinate graphics, perform analysis of attack metric data, and provide an interface that can be interacted with by a user.

In some instances, more or fewer modules may be implemented in one or more applications to perform the functionality herein. The discussion of the modules with an application 200 is not intended to be limiting. The modules displayed can be combined, distributed, additional, or fewer modules then described, which will collectively perform the functionality described herein.

Figure 4:
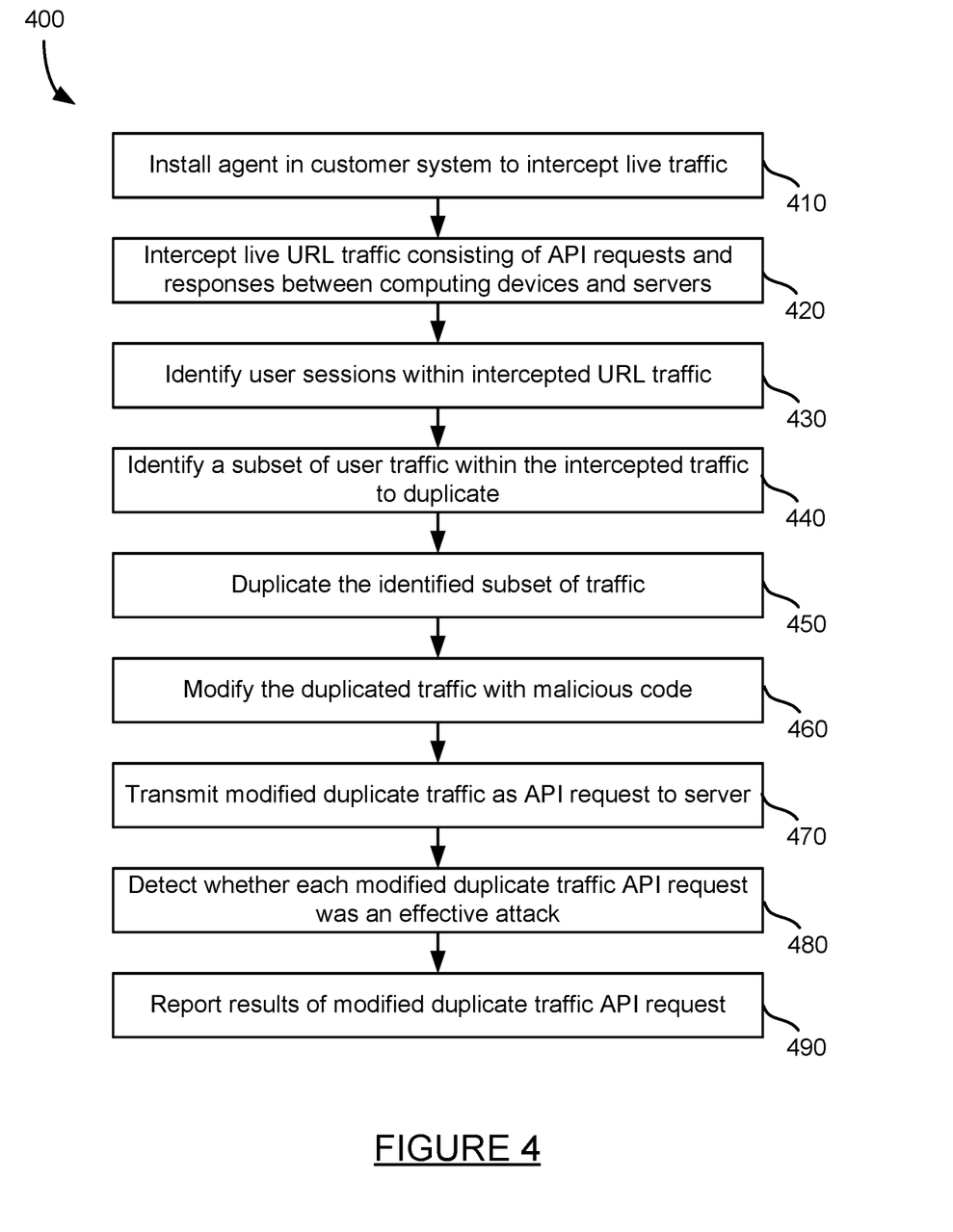
FIG. 4 is a method that automatically performs performing application security testing.

FIG. 4 is a method that automatically performs application security testing. First, agents are installed in a customer system to intercept live traffic at step 410. Live URL traffic consisting of API requests and responses can be intercepted between computing devices and servers by the agent (or, in some instances, browser extensions) at step 320. The agents may intercept the traffic, aggregate the intercepted traffic data, and send the data from the agent to an application periodically, in response to a push or pull event, or based on some other event. The intercepted data can be used to determine the metric, identify traffic to be duplicated, identify user session identification, and other data, and used otherwise as discussed herein. For example, data such as the time a request is received, the sender of the request, and request content can be collected by an agent. The processing of a request, including the response time, content of the response, request and/or response header information, and the destination of the response, can be intercepted or determined by intercepted traffic by an agent as well. Relationships between sent responses and subsequent requests can also be intercepted by one or more agents.

User sessions within intercepted URL traffic are identified at step 430. User sessions may be identified using one or more methods, ranging from extracting a user ID from a token within a header, parsing a header, or retrieving user data from an API response. Once the user sessions are identified, correlations within the user session can be determined.

A subset of user traffic to duplicate is identified within the intercepted traffic at step 440. The subset of user traffic may include traffic associated with a particular user identifier or user session, can include traffic that includes a tag, label, or other marker designating it as traffic to be duplicated, can include traffic intercepted by a particular agent, or received by a particular server, or traffic that is otherwise designated as traffic to be duplicated. More detail or identifying a subset of user traffic to duplicate is discussed with respect to the method of FIG. 5.

The identified subset of traffic is duplicated at step 450. In some instances, the duplication may include making several copies of the traffic, for example one or one API request copies for each parameter value that can be substituted for a particular parameter of the API request.

The duplicated traffic is then modified with malicious code at step 460. In some instances, each API request may be modified by changing a single parameter value. By only changing a single parameter value, a system monitoring the traffic can determine if the single parameter change is the basis of a successful attack. In some instances, after changing on a single parameter in an API request, multiple parameters may be changed if an API request has multiple parameters that can be changed.

The duplicated traffic can be modified based on intelligence derived from analyzing the intercepted traffic. From the intercepted traffic, the system can derive intelligence and business knowledge such as different user identifiers, user sessions that involve typical API traffic associated with a user identifier, user roles, API correlations, API specifications, and other information. The system can use this information to create malicious code in the duplicated legitimate user requests.

For example, the system has knowledge, based on the intelligence derived from the intercepted traffic, regarding which APIs are API parameters are typically transmitted for a particular user role. To generate malicious code to test the security of the system, the malicious code added to an API may include an API parameter that is typical for a user role with a higher clearance or access level than the actual access level allowed for the actual user role for which the code is being modified. To recognize the user role, and add a malicious code attempting to access content that requires a higher access level, utilizes intelligence available the system and is much more efficient and desirable than inserting malicious content in a random manner without any knowledge as to whether the random added content would be a desirable result for an actual attacker.

In another example, the system has intelligence about API correlations, and in particular how the output of one response may be used as the input to another response within a user session. The system may modify a request, which typically uses an output parameter of a previous response within a user session, to include an input parameter that differs slightly from the received output parameter. The input parameter may include, for example, a similar parameter value but associated with a higher access level, or a modified parameter value that is not provided to any user in the system. In this way, the intelligence of the system can be used to strategically test for security weaknesses in the application.

The modified duplicate traffic is transmitted as an API request to a server at step 470 the traffic may be sent, in some instances, one API request at a time to the particular server. More details for transmitting the modified duplicate traffic as an API request to a server is discussed in more detail with respect to the method of FIG. 6.

The system then detects whether each modified to locate traffic API request was ineffective attack on the server at step 480. In some instances, one or more aspects of the server or traffic may be analyzed to determine if the transmitted modified duplicate traffic API was effective as an attack. More details for detecting whether each modified duplicate traffic API request was ineffective attack is discussed in more detail below with respect to the method of FIG. 7.

Results of the modified duplicate traffic API requests are reported at step 490. Reporting may indicate overall metrics, API families with vulnerabilities, as well as details regarding particular API requests and the parameter values that resulted in a successful attack. Reports may be transmitted through a dashboard, as alerts, or some other format.

Figure 5:
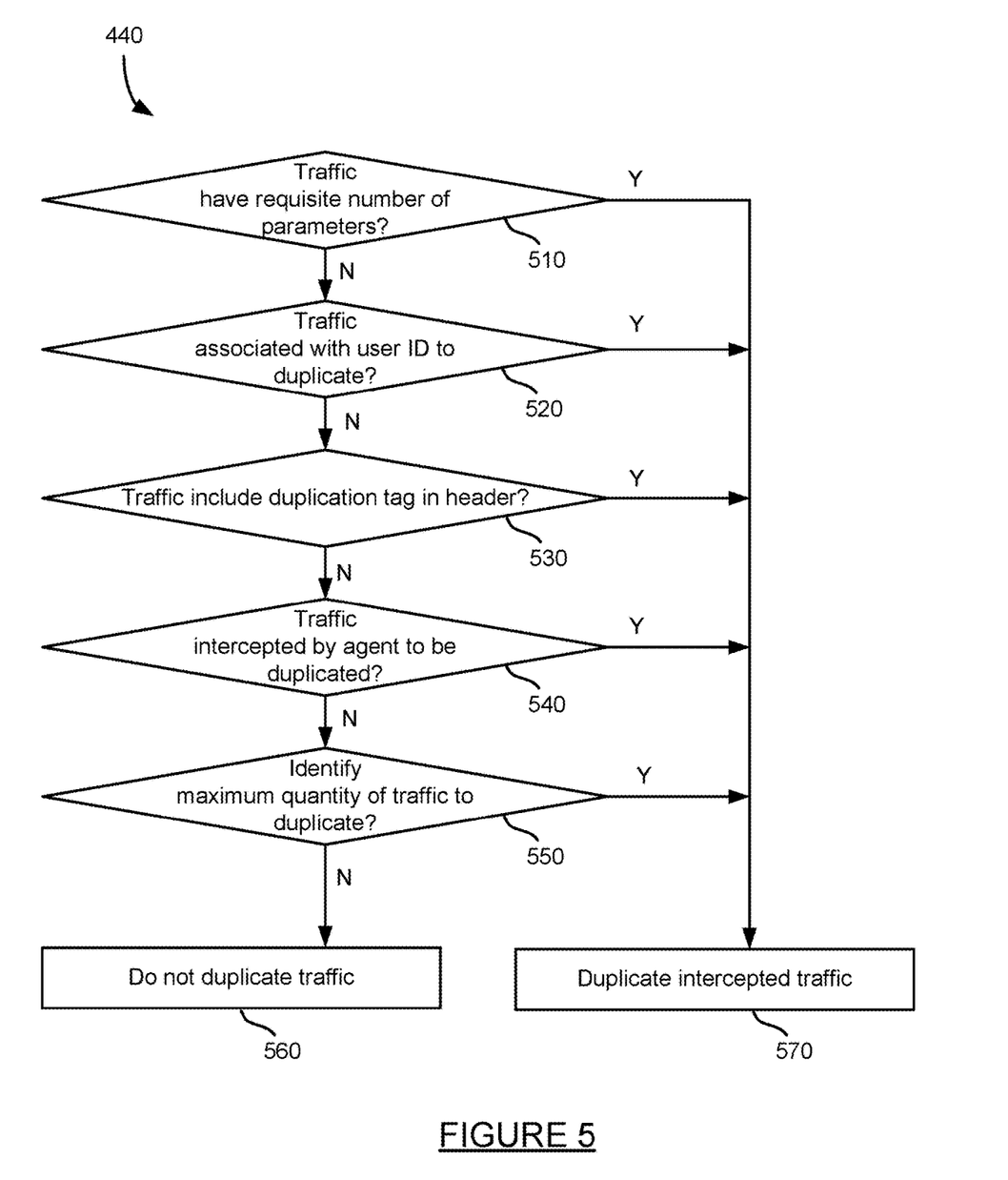
FIG. 5 is a method for identifying a subset of user traffic to duplicate.

FIG. 5 is a method for identifying a subset of user traffic to duplicate. The method of FIG. 5 provides more detail for step 440 of the method of FIG. 4. The method of FIG. 5 includes decision blocks 510-550, each of which setting forth a condition based on which a decision to duplicate traffic can be made. In some instances, the blocks may each be performed in a particular order, including but not limited to the order shown in FIG. 5. In some instances, identifying a subset of user traffic to duplicate may include fewer than all of blocks 510-550, such as just one block or just two blocks, and in any order.

A determination is made as to whether the intercepted traffic has a requisite number of parameters at step 510. In some instances, an API request must have at least one parameter for which a value can be changed. In some instances, two or more parameters may be required in an API request, although only one parameter is typically changed at a time.

If the traffic does have the requisite number of parameters, the intercepted traffic may be duplicated at step 570. If the traffic does not have direct the number of parameters, a determination is made as whether the traffic is associated with a particular user identifier (ID) for which traffic should be duplicated at step 520. If the traffic is associated with the user ID, the traffic may be intercepted at steps 570.

A determination is made at step 530 as to whether any intercepted traffic includes a tag, label, or other marker in a header or elsewhere that indicates the particular traffic should be duplicated, at step 530. If such a tag, header, or other marker is included in the traffic, such as an API request header, the intercepted traffic is duplicated at step 570. A determination can be made as whether the traffic is intercepted by an agent, wherein all traffic intercepted by the agent should be duplicated to be duplicated at step 540. If the traffic is intercepted by an agent for which all traffic is to be duplicated, then the traffic is duplicated at step 570. If the maximum quantity of traffic to be duplicated has been reached, then the intercepted traffic is not duplicated at step 560. If the maximum quantity of traffic has not been reached, then the traffic can be intercepted at step 570.

Figure 6:
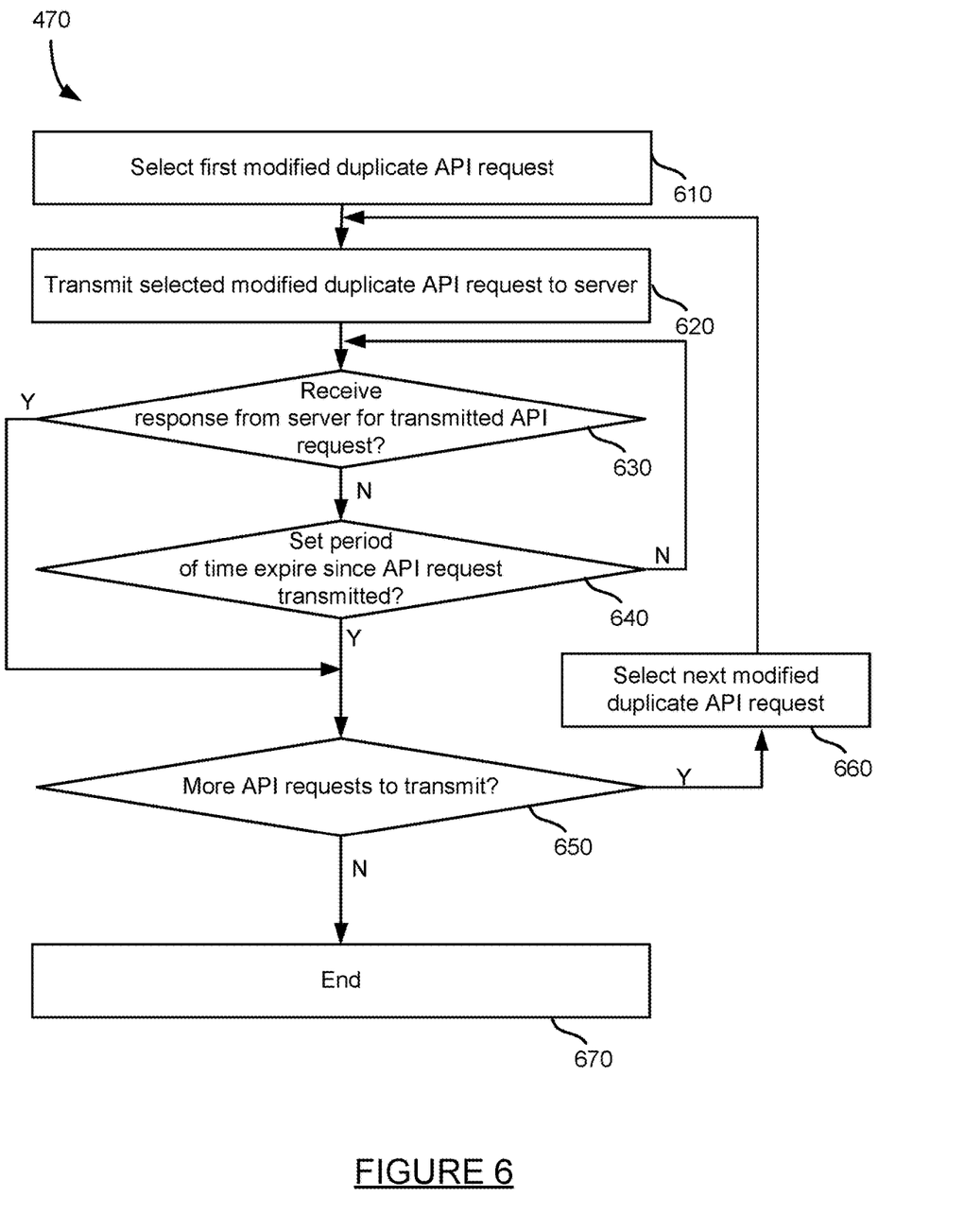
FIG. 6 is a method for transmitting modified duplicate traffic to a server.

FIG. 6 is a method for transmitting modified duplicate traffic to a server. The method of FIG. 6 provides more detail for step 470 of the method of FIG. 4. First, a first modified duplicate API request is selected at step 610. The selected modified duplicate API request is transmitted to a server at step 620. A determination is then made as to whether a response from the server has been received for the transmitted API request at step 630. If a response has been received, the method continues to step 650. If a request has not been received, a determination is made as to whether a set period of time has expired since the API request was transmitted at step 640. The set period of time may apply to a timeout period for the transmitted request. Hence, if the response time for the request has timed out, the process may continue without waiting for a response to the request. If the set period of time has not expired at step 640, the method of FIG. 6 returns to step 630. If the set period of time has expired, the API request is considered to be complete, and a determination is made as whether more API requests exist to be transmitted at step 650. If more API request should be transmitted, the next modified duplicate API request is selected at step 660 and the method returns to step 620. If no more API request are to be transmitted, the method of FIG. 6 ends at step 670.

Figure 7:
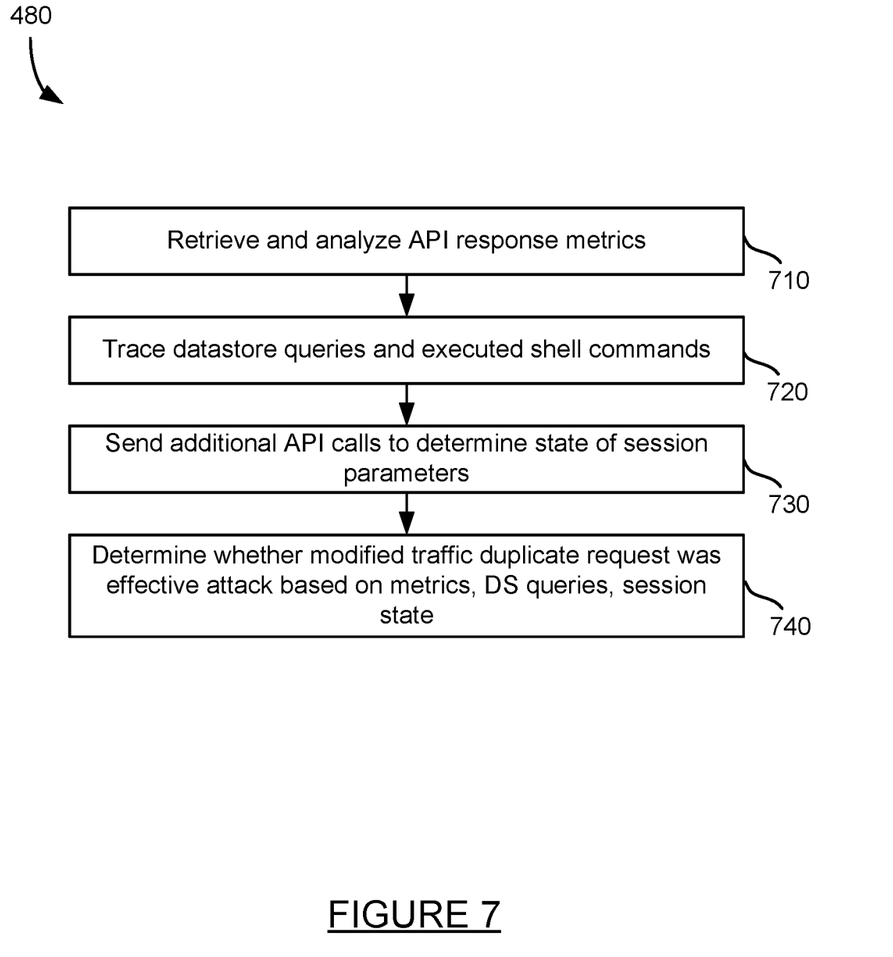
FIG. 7 is a method for detecting whether the transmitted modified duplicate traffic was an effective attack.

FIG. 7 is a method for detecting whether the transmitted modified duplicate traffic resulted in an effective attack. The method of FIG. 7 provides more detail for step 480 of the method of FIG. 4. One or more factors may indicate whether or not the transmitted modified duplicate traffic resulted in ineffective attack. API response metrics may be determined, retrieved, and analyzed at step 610. The metrics may include response time, received errors, and other metrics. Datastore queries and executed shell commands may be traced at step 720. The data store queries that are traced may indicate whether any inappropriate data store activity occurred based on the modified duplicated API traffic that was transmitted. Additional API calls may be sent to the server to determine the state of the session parameters at step 730. A malicious duplicated intercepted traffic API request may have resulted in creating a session state change that allows an unauthorized request to get through to a server. A determination is then made as to whether the modified traffic duplicate request was ineffective attack based on the metrics, data store queries, or session state at step 740.

Figure 8:
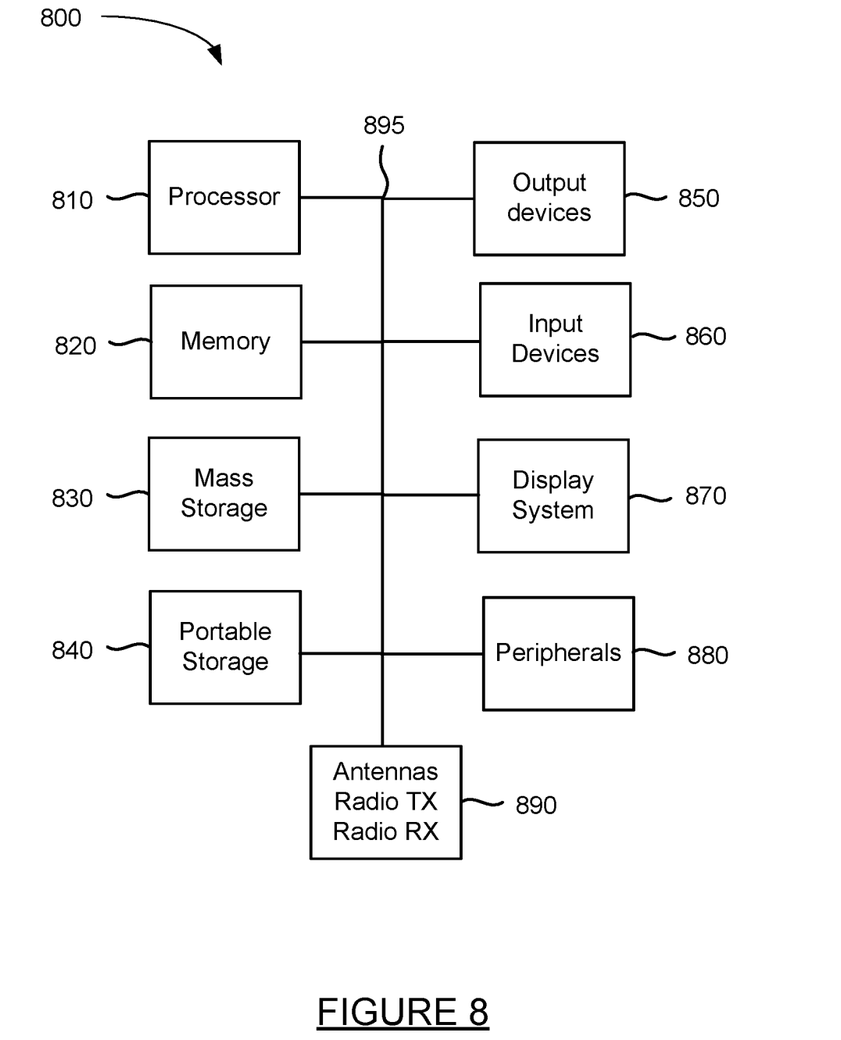
FIG. 8 is a block diagram of a system for implementing machines that implement the present technology.

FIG. 8 is a block diagram of a system for implementing machines that implement the present technology. System 800 of FIG. 8 may be implemented in the contexts of the likes of machines that implement client devices 110-140, customer server 150, Application server 170, and data store 180. The computing system 800 of FIG. 8 includes one or more processors 810 and memory 820. Main memory 820 stores, in part, instructions and data for execution by processor 810. Main memory 820 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and main memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive, an optical disk drive, a flash drive, or other device, is a non-volatile storage device for storing data and instructions for use by processor unit 810. Mass storage device 830 can store the system software for implementing embodiments of the present invention for purposes of loading that software into main memory 820.

Portable storage device 840 operates in conjunction with a portable non-volatile storage medium, such as a floppy disk, compact disk or Digital video disc, USB drive, memory card or stick, or other portable or removable memory, to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 800 as shown in FIG. 8 includes output devices 850. Examples of suitable output devices include speakers, printers, network interfaces, and monitors.

Display system 870 may include a liquid crystal display (LCD) or other suitable display device. Display system 870 receives textual and graphical information and processes the information for output to the display device. Display system 870 may also receive input as a touch-screen.

Peripherals 880 may include any type of computer support device to add additional functionality to the computer system. For example, peripheral device(s) 880 may include a modem or a router, printer, and other device.

The system of 800 may also include, in some implementations, antennas, radio transmitters and radio receivers 890. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 800 of FIG. 8 are those typically found in computer systems that may be suitable for use with embodiments of the present invention and are intended to represent a broad category of such computer components that are well known in the art. Thus, the computer system 800 of FIG. 8 can be a personal computer, handheld computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for testing application security, comprising:
    accessing intercepted application program interface (API) traffic transmitted between a client device and a server;
    identifying a subset of the intercepted traffic to duplicate, the subset selected based on parsing the intercepted traffic;
    duplicating the subset of intercepted traffic;
    modifying the duplication of the subset of intercepted traffic, the modification including transforming the duplicated traffic to include malicious code;
    transmitting the modified duplicate traffic to the server; and
    detecting whether the modified duplicate traffic resulted in a successful attack event on the server.

2. The method of claim 1, wherein the subset is identified based on a user identifier, user role, or session identifier.

3. The method of claim 1, wherein each API in the subset is duplicated a number of times based at least in part on the number of parameters in the particular API.

4. The method of claim 1, wherein each API in the subset is duplicated a number of times based at least in part on the number of possible values for the particular API.

5. The method of claim 1, wherein modifying includes changing a parameter value in an API request.

6. The method of claim 5, wherein the parameter is changed to have a value associated with a different user identifier.

7. The method of claim 5, wherein each request in the duplicated traffic is transmitted with a single changed parameter.

8. The method of claim 1, wherein the duplicated traffic is transmitted to the server within a time associated with a user session that includes the subset of the intercepted traffic that is duplicated.

9. A non-transitory computer readable storage medium having embodied thereon a program, the program being executable by a processor to perform a method for testing application security, the method comprising:
    accessing intercepted application program interface (API) traffic transmitted between a client device and a server;
    identifying a subset of the intercepted traffic to duplicate, the subset selected based on parsing the intercepted traffic;
    duplicating the subset of intercepted traffic;
    modifying the duplication of the subset of intercepted traffic, the modification including transforming the duplicated traffic to include malicious code;
    transmitting the modified duplicate traffic to the server; and
    detecting whether the modified duplicate traffic resulted in a successful attack event on the server.

10. The non-transitory computer readable storage medium of claim 9, wherein the subset is identified based on a user identifier, user role, or session identifier.

11. The non-transitory computer readable storage medium of claim 9, wherein each API in the subset is duplicated a number of times based at least in part on the number of parameters in the particular API.

12. The non-transitory computer readable storage medium of claim 9, wherein each API in the subset is duplicated a number of times based at least in part on the number of possible values for the particular API.

13. The non-transitory computer readable storage medium of claim 9, wherein modifying includes changing a parameter value in an API request.

14. The non-transitory computer readable storage medium of claim 13, wherein the parameter is changed to have a value associated with a different user identifier.

15. The non-transitory computer readable storage medium of claim 13, wherein each request in the duplicated traffic is transmitted with a single changed parameter.

16. The non-transitory computer readable storage medium of claim 9, wherein the duplicated traffic is transmitted to the server within a time associated with a user session that includes the subset of the intercepted traffic that is duplicated.

17. A system for automatically forecasting values for system metric time series, comprising:
    a server including a memory and a processor; and
    one or more modules stored in the memory and executed by the processor to access intercepted application program interface(API) traffic transmitted between a client device and a server, identify a subset of the intercepted traffic to duplicate, the subset selected based on parsing the intercepted traffic, duplicate the subset of intercepted traffic, modify the duplication of the subset of intercepted traffic, the modification including transforming the duplicated traffic to include malicious code, transmit the modified duplicate traffic to the server, and detect whether the modified duplicate traffic resulted in a successful attack event on the server.

18. The system of claim 17, wherein the subset is identified based on a user identifier, user role, or session identifier.

19. The system of claim 17, wherein each API in the subset is duplicated a number of times based at least in part on the number of parameters in the particular API.

20. The system of claim 17, wherein each API in the subset is duplicated a number of times based at least in part on the number of possible values for the particular API.

* * * * *